Aug. 11, 1931.      A. L. THOMAS      1,818,020
LICENSE TAG
Filed March 8, 1930
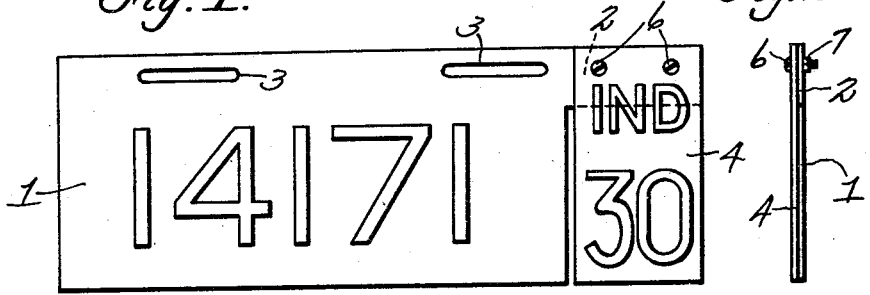
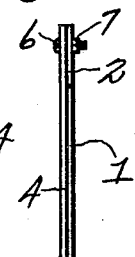
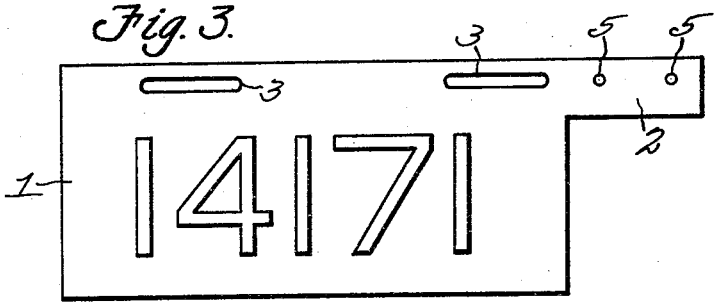
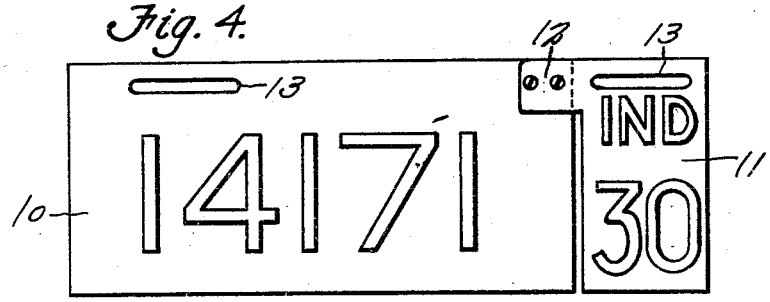
INVENTOR.
Albert L. Thomas.
BY
ATTORNEY.

Patented Aug. 11, 1931

1,818,020

UNITED STATES PATENT OFFICE

ALBERT L. THOMAS, OF SOUTH BEND, INDIANA

LICENSE TAG

Application filed March 8, 1930. Serial No. 434,278.

The invention relates to license tags, and particularly to automobile license tags, and has for its object to provide an article of this character in which the license number is impressed on a main plate to which is detachably appended a supplemental plate on which the year for which the license is issued is impressed, so that a license number may be issued for a period of years and renewed each year by changing the supplemental plate for one of the current year, whereby only the small supplemental plate is discarded each year rather than the large plate now in common use; which effects a great saving of license tag material over a period of years, reduces the amount of clerical work necessary in issuing licenses each year, and eliminates the necessity of the driver remembering a new license number each year.

A further object is to provide an article of this character in which a main number bearing plate and a supplemental date plate are detachably secured together, one of said plates having a projection integrally formed therewith to which the other plate is secured, said plates being so disposed when assembled that their adjacent edges are slightly spaced apart to minimize chattering and rattling of said plates when loose.

A further object is to provide an article of this character in which a main number bearing plate and a supplemental date bearing plate are detachably secured together, the size and shape of said main and supplemental plates being such that said tag is of substantially rectangular shape when assembled.

A further object is to provide an article of this character which is simple and cheap of construction and in which a minimum of parts and material is used.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a plan view of the license tag in assembled relation.

Figure 2 is an end view of the assembled license tag.

Figure 3 is a plan view of the main plate.

Figure 4 is an assembled plan view of a modified form of the license tag.

Referring to the drawings, the numeral 1 designates a plate of substantially rectangular shape which has an extension 2 formed integrally therewith and projecting from one of the sides thereof, said extension 2 preferably being narrow relative to said plate 1 and having its upper edge forming a continuation of the upper edge of said plate 1. The plate 1 forms the main plate of the license tag and has suitably impressed thereon the license number; and said main plate also has apertures 3 formed therein adjacent the upper edge thereof by means of which the plate may be secured to a suitable bracket (not shown) carried by the automobile to which it is to be applied. A small supplemental plate 4, on which are preferably impressed the abbreviated name of the state issuing the license and the last two numbers of the current year for which the license is issued is adapted to be detachably mounted on the extension 2 of the main plate, said extension and supplemental plate having registering apertures 5 therein through which extend suitable bolts 6, which, with cooperating nuts 7, detachably secure said main and supplemental plates together. When the license tag is operatively assembled, the supplemental plate 4 contacts only the extension 2 of the main plate and is slightly spaced from the end of the main plate 1 whereby the two parts of said license tag cannot chatter and rattle, as would be the case otherwise when the plates are secured at only one end and the other end is free. The supplemental plate is preferably rectangular in shape and its upper and lower edges are preferably aligned with the upper and lower edges of the main plate when operatively secured thereto, the assembled license tag thus having a rectangular outline broken only by the spacing of the main and supplemental plates at the lower end thereof.

A modified form of license tag is illustrated in Figure 4, in which the main plate 10 is rectangular and the supplemental plate 11 has an extension 12 integrally formed therewith and projecting from one side thereof with its upper edge in alignment with the upper edge of the supplemental plate, said extension 12 overlapping a portion of the main plate 10 and forming means by which the main and supplemental plates may be secured together. In this form the main plate carries the license number and the supplemental plate carries the name of the state and the current year as in the preferred form, the major portion of the adjacent edges of the main and supplemental plates are also slightly spaced apart, and the general outline of the assembled tag is also rectangular. This form of the license tag is thus a reversal of the preferred form thereof with respect to the member carrying the extension to which the other member is secured, and the only other difference between this modified form and the preferred form is in the location of the apertures 13 corresponding to the apertures 3 of the preferred form by which the tag is secured to the automobile bracket, one of said apertures 13 being formed in each of the main and supplemental plates adjacent the outer upper ends of the assembled license tag.

It will thus be seen that a license plate is provided which is formed of a main, license numbered plate, and a supplemental plate indicating the state by which and the year for which the license is issued, said plates being suitably detachably secured together in a manner whereby they may be easily separated to permit a new supplemental plate to be applied to the main plate, as where the license is extended for a new year. The license plate is of regular outline, is constructed simply and in a manner to minimize chatter and rattle of the plates, requires only a minimum of material and parts, permits the same license number to be retained by mere renewal of the license of the previous year and application of a new supplemental plate; and thus saves time and money for the state and eliminates the necessity of the licensee learning a new number every year.

The invention having been set forth, what is claimed as new and useful is:

1. In a license tag, the combination of a main plate having a relatively narrow extension in line with the upper longitudinal edge thereof, a supplemental smaller plate dependent from and adapted to be detachably carried by said extension, said smaller plate and extension having apertures formed therein, and a fastening device received by said apertures for securing the plates together, said apertures being located in said parts so as to control the relative placement thereof and hold the same in spaced relation for the major portion of their adjacent edges.

2. In a license tag, the combination of a main plate having a relatively narrow longitudinal extension at one end thereof, a supplemental smaller plate adapted to be detachably carried by said extension, and means for securing said supplemental plate to said extension with the adjacent edges of the plate positioned in spaced relation for the major portions thereof.

3. In a license tag, the combination of a main plate and a supplemental smaller plate, one of said plates having a relatively narrow extension at one edge thereof extending longitudinally of the tag and adapted to overlap the other plate, and means for detachably securing said extension to the other plate and arranged to position the adjacent edges of said plates in spaced relation for the major portion thereof, the upper and lower edges of the main plate and supplemental plate being aligned whereby said tag has a rectangular outline when assembled.

4. In a license tag, the combination of a main plate and a supplemental smaller plate, one of said plates having a relatively narrow extension projecting from one edge thereof adapted to overlap the other plate, and means for detachably securing said extension to the other plate, said means being arranged to position the adjacent edges of said plates in spaced relation for the major portions thereof.

In testimony whereof I affix my signature.

ALBERT L. THOMAS.